(No Model.)
J. L. DOLSON.
VEHICLE GEARING.
No. 446,437. Patented Feb. 17, 1891.
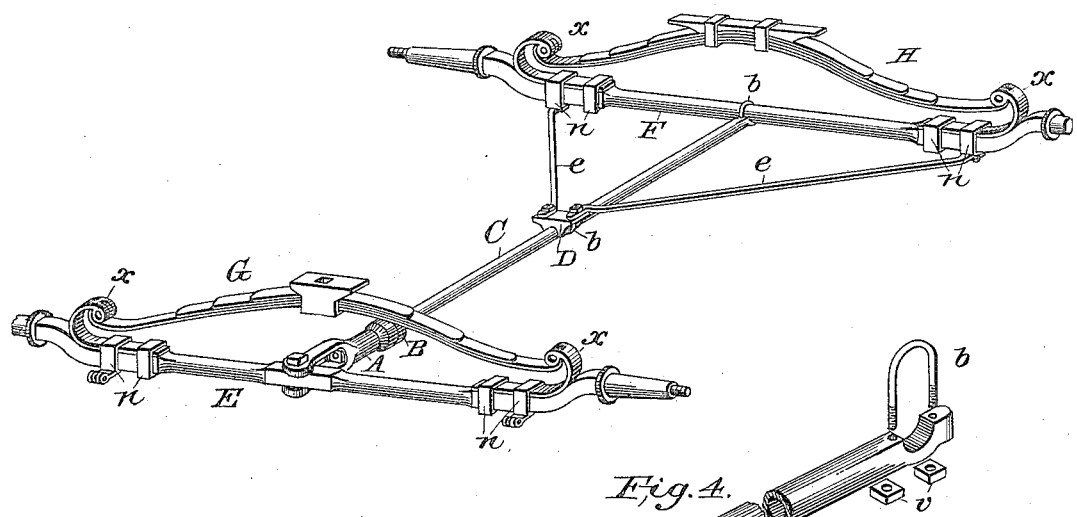
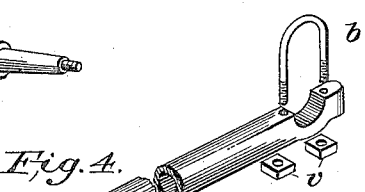
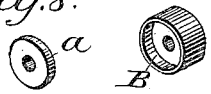
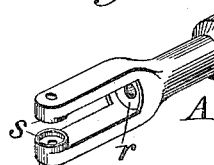
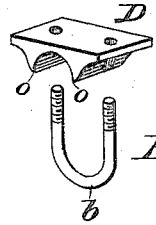
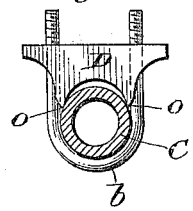
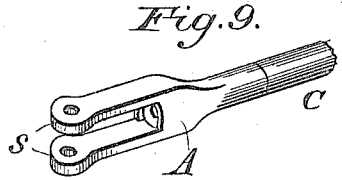
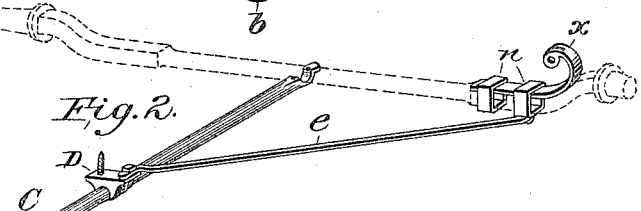
Witnesses:
Inventor.
John L. Dolson

UNITED STATES PATENT OFFICE.

JOHN L. DOLSON, OF CHARLOTTE, MICHIGAN.

VEHICLE-GEARING.

SPECIFICATION forming part of Letters Patent No. 446,437, dated February 17, 1891.

Application filed December 12, 1889. Serial No. 333,547. (No model.)

*To all whom it may concern:*

Be it known that I, JOHN L. DOLSON, a citizen of the United States, residing at the city of Charlotte, in the county of Eaton and State of Michigan, have invented a new and useful Vehicle-Gearing, of which the following is a specification.

My invention relates to improvements in vehicle-gearings in which a noiseless swiveled reach is used in connection with an adjustable brace attachment; and the objects of my improvements are, first, to remove any strain on the gearing in consequence of one of the wheels passing over an obstruction or running into a rut; second, to facilitate the proper adjustment of the braces running from the center of the reach to the ends of the hind axle; third, to prevent any rattle, and, fourth, to furnish a cheap, simple, durable, and easily-constructed gearing for vehicles. I attain these objects by the mechanism illustrated in the accompanying drawings, in which—

Figure 1 is a view in perspective of the gearing without the wheels. Fig. 2 is a view of the reach and brace attachment. Fig. 3 is a grip. Fig. 4 is a vehicle-reach. Fig. 5 is a clip. Fig. 6 is a cap. Fig. 7 is a swivel. Fig. 8 is a washer. Fig. 9 is a swivel, and Fig. 10 a detail in section showing manner of setting lug upon the reach.

Similar letters refer to similar parts throughout the several views.

The special features of my device are best observed, and my intention is to operate the same, upon light vehicles, although I do not wish to limit my device to any particular form of gearing outside of the improvements claimed. The gearings will usually be constructed entirely of good steel, iron, and malleable iron, which will not be effected by the climate, and which will contain no defective or low grades of wood. By my device the rattle and noise heretofore occurring in iron gearing, and which made iron gearings objectionable, is entirely obviated.

The axles E and F are similar in form, of the usual length, and have a curved shoulder near each extremity for receiving and supporting the spring-jacks $x\ x\ x\ x$. The ends of the axle are square from the spindle of the wheels toward the center to the ends of the spring-jacks $x\ x\ x\ x$. The center of the forward axle E is flattened, through which a hole is drilled large enough to admit the king-bolt through the end of the swivel A. The axles are made of steel throughout, giving them thereby a light appearance, and are circular in form between the ends of the spring-jacks $x\ x\ x\ x$, although good axle-timber may be used for a part of the axles between the wheels, if desirable.

The spring-jacks $x\ x\ x\ x$ are made of good steel and extend far enough back on the axles E F to receive two clips $n\ n$, by which the spring-jacks are held firmly to the shoulders of the axles.

The springs G and H are the ordinary scroll-spring of sufficient length to reach between the spring-jacks, and are made light and elastic when the vehicle is to be used for riding in only, and correspondingly heavier and stiffer when the vehicle is intended for carrying loads.

The clips $n\ n$ encircle the spring-jacks $x\ x\ x\ x$ and axles, and on the forward side of the outside clips $n\ n$ on the forward axle is clipped the thill or pole loops.

The reach C is constructed out of ordinary gas-pipe, with a spindle $l$ welded into the opening at the forward end, with the hind end plugged, flattened, and properly shaped for receiving the hind axle F. Two holes are also drilled into the hind end of the reach on opposite sides of the curve just far enough apart to receive the axle F, and through which passes the staple $b$ for holding the reach C securely to the axle F. The spindle $l$ is securely welded into the forward end of the reach C, and has a thread cut upon one end for receiving a burr.

The grip or lug D is a piece of iron or steel having a hole in each end just far enough apart to allow the tubular reach C to pass between the holes; also, having two sharp-edged projections $o\ o$ running across the lug D near enough together to grip into the tubular reach C when the same is bolted down by means of the clip $b$, Fig. 5. The sharp projections $o\ o$ of the lug D, gripping into the tubular reach C when bolted down, hold the reach firmly and prevent the lug from slipping, as might happen in case the lug D were only held in place by the pressure of the clip $b$, bolted straddle of the reach C.

The clip B is made of good malleable iron with a hole in the center large enough to admit the spindle *l* of the reach C, and is dished out in the forward end sufficiently to receive the rubber washer *a* and the end of the swivel A, as shown in Fig. 2. The swivel A is constructed of malleable iron, is tubular at one end for receiving the spindle *l*, and clamp-shaped at the other end, and between the upper and lower jaws *s s* the forward axle E passes. The jaws *s s* have a hole drilled through the center corresponding with the hole in the center of the forward axle E, through which the king-bolt passes.

The swivel A has a socket *r* in the center, in which a rubber washer *a*, with an iron cap, is placed before the burr is screwed onto the spindle *l*, for the purpose of preventing any rattle and to insure a snug bearing upon each end of the swivel A.

I do not wish to confine myself strictly to the form of the swivel described, as a plane tubular swivel without the washers or iron cap, as is shown in Fig. 9, may be used.

In one of the jaws *s s* of the swivel A a rubber washer covered with an iron cap or washer is placed, through which the king-bolt also passes to prevent any rattle of the swivel and axle. The tubular swivel A may also have a leather or metallic lining to form a box for the spindle *l*.

In the construction of my device I put the cap B upon the spindle *l*, so as to fit up snugly against the shoulder of the tubular reach C, with the end for receiving the washer *a* toward the forward end of the reach. The rubber or leather washer *a* is next put on the spindle *l*, and within the cap B, after which the swivel A, with another rubber washer and iron cap in the socket *r*, is placed upon the spindle *l*, and a burr screwed on the end, as shown in Fig. 2. The braces *e e* are then paired, of an equal length, and bolted to the lug at the center of the reach by means of the staple *b*, Fig. 5, the staple *b* being placed astride the reach, upon which is then placed the lug D, and then the end of the braces *e e* are securely bolted down upon the lug D and to the reach C. All that is required of the braces *e e* is that each pair be of uniform length, as the lug D will readily adjust itself to different length braces. Also, the sharp edges *o o* of the lug D, by gripping into the reach C, hold the braces *e e* securely and prevent any rattling. It will also be seen that a rubber washer *a*, being at each end of the swivel A, will take up any end motion of the swivel A upon the spindle *l* and prevent any rattling. I then bolt the spring-jacks *x x x x* to the axles E and H by means of the clips *n n*, the outside clips *n n* on the forward axle E having the thill or pole loops, and the outside clips *n n* on the hind axle F holding the end of the braces *e e*. The end of the reach C is then bolted to the hind axle by means of a staple-bolt with thread and burr on each end, as shown in Fig. 4, and the forward end of the reach is secured to the forward axle E by passing a king-bolt through the jaws *s s* of the swivel containing a rubber washer and cap and the hole in the center of the forward axle E. The ends of the springs G and H, with body-blocks attached, are then bolted into the ears of the spring-jacks *x x x x*, thereby allowing the springs to vibrate, and the gearing is ready for the body and wheels.

A gearing constructed of iron may be manufactured in any climate and used in any kind of weather without swelling or shrinking any part. The joint in the reach caused by the swivel A prevents any friction or strain on the gearing, and the rubber washers take up the space caused by wearing and prevent any rattling.

Having thus described my device, what I claim, and desire to secure by Letters Patent, is—

1. In a vehicle-gearing, the combination of a reach having its forward end swiveled, a grip D, secured to said reach and having the sharp projections *o o* to bite or grip into the reach, and the braces *e e*, secured to the grip D and rear axle, substantially as described.

2. In a vehicle-gear, the combination of a reach C, having the spindle *l*, the dished clip B, having rubber washer *a* in the dished portion and an opening for the spindle *l*, the swivel A, having jaws *s s*, by which it is secured to the axle by a king-bolt, and a longitudinal opening for the spindle, which is held in place by a nut located between the jaws *s s*, substantially as described.

JOHN L. DOLSON.

Witnesses:
MAYNARD B. BUTLER,
GEO. W. ROWLEY.